Sept. 25, 1928.

B. M. SMALLEY

INSULATOR SUPPORT

Filed June 22, 1925

1,685,684

Witnesses:
William P. Kilroy
Harry R. Leslie

Inventor:
Burton M. Smalley

By Brown, Boettcher & Dinner
Attys.

Patented Sept. 25, 1928.

1,685,684

UNITED STATES PATENT OFFICE.

BURTON M. SMALLEY, OF CHICAGO, ILLINOIS, ASSIGNOR TO JOSLYN MANUFACTURING & SUPPLY CO., OF CHICAGO, ILLINOIS, A CORPORATION OF ILLINOIS.

INSULATOR SUPPORT.

Application filed June 22, 1925. Serial No. 38,622.

My invention relates to insulator supports particularly adaptable for supporting spool type insulators, and the object of the invention is to produce a structure in which the various parts are stamped and formed up out of sheet metal and so formed and arranged as to give the greatest strength, rigidity and support with a comparatively small quantity and weight of metal.

My improved structure is shown on the accompanying drawing, in which

Figure 1:
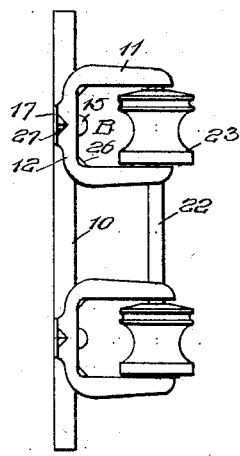
Fig. 1 is a side elevational view.

The spacing and supporting body 10 may support any number of brackets B. The body is of U-shape cross-section and formed from a single piece of sheet metal. Each bracket structure is formed from a single piece of sheet metal and is of U-shape cross-section throughout with its limb flanges 11 and the yoke flanges 12 extending outwardly. The brackets are applied with their yoke walls 13 against the front wall 14 of the supporting frame 10 and are secured in this position by welding or, as shown, by rivets 15. The yoke flanges 12 of the brackets extend down along the outside of the side flanges 16 of the supporting frame 10 and thus assist the rivets in securing the brackets against lateral or rotational displacement. From the outer edges of the yoke flanges of the brackets ears 17 extend outwardly with their outer surfaces preferably flush with the outer edges of the flanges 16 of the supporting frame 10, and these ears have vertically elongated bolt openings 18. The ears, together with the outer edges of the supporting frame, form an extended seating base or surface for the entire structure. In the front wall 14 of the frame 10 are the elongated bolt holes 19, by means of which the frame 10 may be supported in addition to the support afforded by bolts extending through the ear openings 18.

The upper and lower webs or walls 20 and 21 of the brackets have bolt holes 21 therethrough and a separate bolt may be provided for each bracket, or, as shown, a common bolt 22 may be provided extending through the holes 21 of all of the vertically aligned brackets. In each bracket is a spool insulator 23 whose axial opening 24 receives the bolt so that the insulator is rotatably secured in the bracket. A cotter pin 25 is applied in the end of the bolt to lock it in place.

The brackets may be deflected inwardly at their corners to form strengthening or brace wall sections 26 and likewise brace walls 27 may be provided by deflecting at the bends between the yoke flanges 12 and the ears 17. On the outsides of the brackets, these deflected wall sections 26 leave troughs or inclined gutters 28, and adjacent the lower ends of these gutters holes 29 are provided in the wall 14 of the frame 10 so that any water accumulating in the tops of the brackets may escape through the troughs and holes and thus prevent accumulation of water and permit the structure to dry rapidly and so prevent corrosion.

Figure 2:
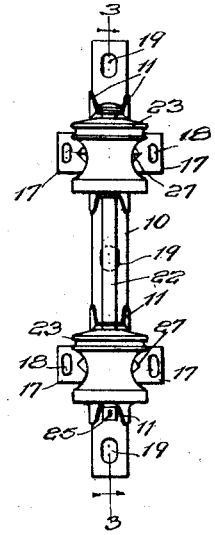
Fig. 2 is a front elevational view.
Figure 3:
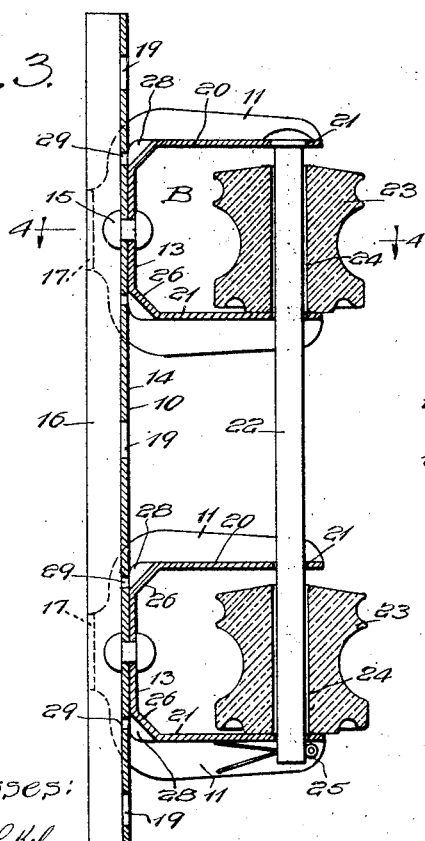
Fig. 3 is an enlarged sectional view on plane 3—3 of Fig. 2.
Figure 4:
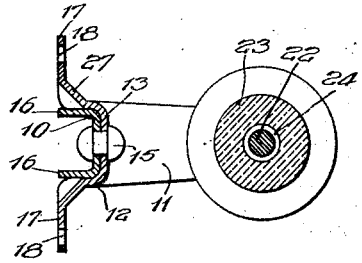
Fig. 4 is a sectional view on plane 4—4 of Fig. 3.

I wish to call attention to a fundamentally novel feature which is at the basis of my invention, and that is the U-shaped bracket frames B in which the insulators 23 are mounted, are now supported directly by the attaching bolts that pass through the holes 18—18 in the ears 17. No intervening joint whatsoever is employed. Hence, even if the single rivet 15 should give away, the frame would not lose its support and pull over sidewise or twist about into an undesirable position. This novel support of the bracket frame relegates the channel member 10 and the rivet 15 to relatively secondary functions, namely, first to hold the U-shaped frame B in suitable spaced relation from an adjacent frame for assembly, transportation and application to a suitable support, and, second, to take up any possible tendency for the frame B to swing or rock up or down (as viewed in Figs. 1, 2 and 3) by pivoting upon the supporting bolts. Such pivoting would of course be resisted by the common rod 22, but by the above disposition and distribution of the metal of the parts the channel member may be much reduced in size and weight and yet provide ample strength for the purpose. The channel may of course be attached to the support for additional strength.

The metal in the structure is proportioned and distributed to give the greatest strength and rigidity for the least weight and by extending bolt ears from the brackets the rivets 15 are relieved from excessive strain. Modifications in construction and arrangement can be made without departing from the scope of the invention, and I do not therefore desire to be limited to exactly what I have shown and described.

I claim the following:—

1. An insulator bracket structure comprising a back frame adapted to be secured to a support, a U-shaped bracket having its yoke wall secured to said back frame and its limb walls extending laterally, flanges extending from said yoke wall alongside of said back frame and ears at the edges of said flanges having bolt holes whereby said bracket may be secured directly to the support to which the back frame is secured.

2. An insulator bracket structure comprising a back frame formed from a single piece of sheet metal and of U-shape cross-section, a bracket comprising yoke and limb wall parts, said bracket being formed from a single piece of sheet metal and being of U-shaped cross-section, the yoke wall parts of said bracket receiving said back frame and being secured thereto, and ears extending laterally from said yoke wall, said ears and said back frame having bolt holes whereby the structure may be secured to a support.

3. A U-shaped insulator bracket formed from a single piece of sheet metal and comprising a yoke wall and lateral walls, strengthening flanges extending from said walls, and ears extending laterally from the flanges on the yoke walls, said ears having bolt holes whereby the bracket may be secured to a support.

4. An insulator bracket structure comprising a back frame, a U-shaped bracket having its yoke wall secured to said back frame and with its limb walls extending horizontally, said bracket being formed from a single piece of sheet metal and having side flanges on its walls, the flanges of the yoke wall extending alongside of said back frame and ears on said flanges having bolt holes whereby the structure may be secured to a support, deflections at the corners of said bracket forming brace walls on the inside of the bracket and gutters on the outside thereof, said back frame having holes in registration with said gutters whereby moisture may escape from the top of said bracket.

5. In a device of the class described, a U-shaped bracket frame comprising a yoke member and two integral leg members, said members being formed of continuous channel section, the flanges of the yoke member having integral laterally extending lugs perforated to receive attaching bolts for supporting said U-shaped bracket frame directly upon a supporting surface.

6. In a device of the class described, the combination of a U-shaped bracket frame comprising a yoke member and two integral leg members, said members being formed of continuous channel section, the flanges of the yoke member having integral laterally extending lugs perforated to receive attaching bolts for supporting said U-shaped bracket frame directly upon a supporting surface, and a channel bar nesting within and secured to the channel of the yoke member to hold the U-shaped bracket member against rocking on the lugs.

In witness whereof, I hereunto subscribe my name this 21st day of April, 1925.

BURTON M. SMALLEY.